(12) United States Patent
Zhang et al.

(10) Patent No.: US 12,080,315 B2
(45) Date of Patent: Sep. 3, 2024

(54) AUDIO SIGNAL PROCESSING METHOD, MODEL TRAINING METHOD, AND RELATED APPARATUS

(71) Applicant: TENCENT TECHNOLOGY (SHENZHEN) COMPANY LIMITED, Shenzhen (CN)

(72) Inventors: Jinliang Zhang, Shenzhen (CN); Tao Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 346 days.

(21) Appl. No.: 17/700,862

(22) Filed: Mar. 22, 2022

(65) Prior Publication Data

US 2022/0215853 A1 Jul. 7, 2022

Related U.S. Application Data

(63) Continuation of application No. PCT/CN2020/124244, filed on Oct. 28, 2020.

(30) Foreign Application Priority Data

Jan. 9, 2020 (CN) .......................... 202010023045.6

(51) Int. Cl.
*G10L 21/0232* (2013.01)
*G06N 3/08* (2023.01)
(Continued)

(52) U.S. Cl.
CPC ............ *G10L 21/0232* (2013.01); *G06N 3/08* (2013.01); *G10L 21/0264* (2013.01); *G10L 21/0332* (2013.01)

(58) Field of Classification Search
CPC ............. G10L 21/0232; G10L 21/0264; G10L 21/0332; G10L 21/0316; G10L 21/007;
(Continued)

(56) References Cited

U.S. PATENT DOCUMENTS 5,621,724 A * 4/1997 Yoshida ................. H04M 9/082
370/290
8,144,895 B2 * 3/2012 Ura .......................... H04R 3/02
381/94.1
(Continued)

FOREIGN PATENT DOCUMENTS

CN 108449493 A 8/2018
CN 109121057 A 1/2019
(Continued)

OTHER PUBLICATIONS

The European Patent Office (EPO) Extended Search Report for EP Application No. 20911413.1 Sep. 27, 2022 8 Pages.
(Continued)

*Primary Examiner* — Linda Wong
(74) *Attorney, Agent, or Firm* — ANOVA LAW GROUP PLLC

(57) ABSTRACT

This application discloses an audio signal processing method, a model training method, and related apparatus. The audio signal processing method includes inputting a first audio input signal into a machine learning model to obtain a first howling point, and obtaining a first gain value according to the first howling point, the first howling point corresponding to an effective audio signal in the first audio input signal, and the first gain value indicating a suppression parameter of the first howling point; processing the first audio input signal according to the first gain value to obtain a second audio input signal; detecting a second howling point, and obtaining a second gain value according to the second howling point, the second howling point correspond-
(Continued)

ing to a frequency band of an ineffective audio signal in the second audio input signal; and processing the second audio input signal to obtain an audio output signal.

20 Claims, 11 Drawing Sheets

(51) Int. Cl.
*G10L 21/0264* (2013.01)
*G10L 21/0332* (2013.01)

(58) Field of Classification Search
CPC ..... G10L 21/0216; G10L 25/18; G10L 25/21; G10L 25/30; G06N 3/08; G06N 3/045; G06N 3/044; G06N 20/00; H04M 9/082; H04R 3/02

See application file for complete search history.

(56) References Cited

U.S. PATENT DOCUMENTS

| 11,315,587 B2* | 4/2022 | Defraene | G06N 3/08 |
| 2003/0012388 A1* | 1/2003 | Ura | H04R 3/02 |
| | | | 381/66 |
| 2018/0090152 A1 | 3/2018 | Ichimura | |

FOREIGN PATENT DOCUMENTS

| CN | 109637552 A | 4/2019 |
| CN | 109831732 A | 5/2019 |
| CN | 110536215 A | 12/2019 |
| CN | 111210021 A | 5/2020 |

OTHER PUBLICATIONS

The World Intellectual Property Organization (WIPO) International Search Report for PCT/CN2020/124244 Feb. 10, 2021 6 Pages (including translation).

* cited by examiner

AUDIO SIGNAL PROCESSING METHOD, MODEL TRAINING METHOD, AND RELATED APPARATUS

RELATED APPLICATIONS

This application is a continuation application of PCT Application No. PCT/CN2020/124244, filed on Oct. 28, 2020, which in turn claims priority to Chinese Patent Application No. 202010023045.6, entitled "AUDIO SIGNAL PROCESSING METHOD, MODEL TRAINING METHOD, AND RELATED APPARATUS" filed on Jan. 9, 2020. The two applications are both incorporated by reference in their entirety.

FIELD OF THE TECHNOLOGY

This application relates to the field of computer technologies, and in particular, to audio signal processing.

BACKGROUND OF THE DISCLOSURE

With the development of technologies related to mobile terminals, more smart devices appear in people's daily life. Making a voice call through a smart device is a particularly prominent function of the device. However, during a call process, a microphone at a local terminal also acquires an audio signal of a speaker at an opposite terminal, causing the audio signal to loop in the voice process between the local terminal and the opposite terminal. Especially during a short-range voice process, the audio signal continuously obtains a loop gain, resulting in howling.

Generally, a frequency shifter or a phase shifter may be used for processing an input audio at a local terminal, that is, audio information consistent with a phase of howling is destroyed to suppress the howling.

SUMMARY

In view of the previous description, this application provides an audio signal processing method, so that a howling point can be effectively located and howling can be suppressed to improve the audio signal processing accuracy.

One aspect of the embodiments of this application provides an audio signal processing method, which may be applied to a system or a program including an audio signal processing function in a terminal device, and specifically includes obtaining a first audio input signal; inputting the first audio input signal into a machine learning model to obtain a first howling point, and obtaining a first gain value according to the first howling point, the first howling point indicating a howling point of a frequency band corresponding to an effective audio signal in the first audio input signal, and the first gain value indicating a suppression parameter of the first howling point; processing the first audio input signal according to the first gain value to obtain a second audio input signal; detecting the second audio input signal to obtain a second howling point, and obtaining a second gain value according to the second howling point, the second howling point indicating a howling point of a frequency band corresponding to an ineffective audio signal in the second audio input signal; and processing the second audio input signal according to the second gain value to obtain an audio output signal.

Another aspect of the embodiments of this application provides a machine learning model training method, including acquiring a reference signal and a voice sample signal, the reference signal being a howling signal determined based on at least two variable elements, the variable elements comprising a program category, a program running period, or a program running location, and the acquired signal indicating an effective voice in a call progress; generating a feature training set according to the reference signal and the acquired signal; and inputting the feature training set into a machine learning model for at least one cycle of training to obtain a trained machine learning model, the trained machine learning model determining a corresponding howling point and gain value according to an audio input signal.

Another aspect of this application provides a computer device, including: a memory, a processor, and a bus system, the memory being configured to store program code; and the processor being configured to perform, according to instructions in the program code, the audio signal processing method according to the aspect above, or the machine learning model training method according to the aspect above.

Another aspect of this application provides a non-transitory computer-readable storage medium, the storage medium being configured to store a computer program, and the computer program being configured to perform the audio signal processing method according to the aspect above, or the machine learning model training method according to the aspect above.

Consistent with the embodiments of the present disclosure, howling is suppressed in an audio input signal at an initial stage and therefore cannot obtain a loop gain. With the aid of the correspondence of a howling point indicated in the machine learning model, the convenience of model calculation, and further processing on an unprocessed howling point by using the second gain value, a rapid and thorough process of the howling suppression is implemented without affecting the effective audio signal, so that the audio processing accuracy and efficiency are improved.

DESCRIPTION OF EMBODIMENTS

Figure 1:
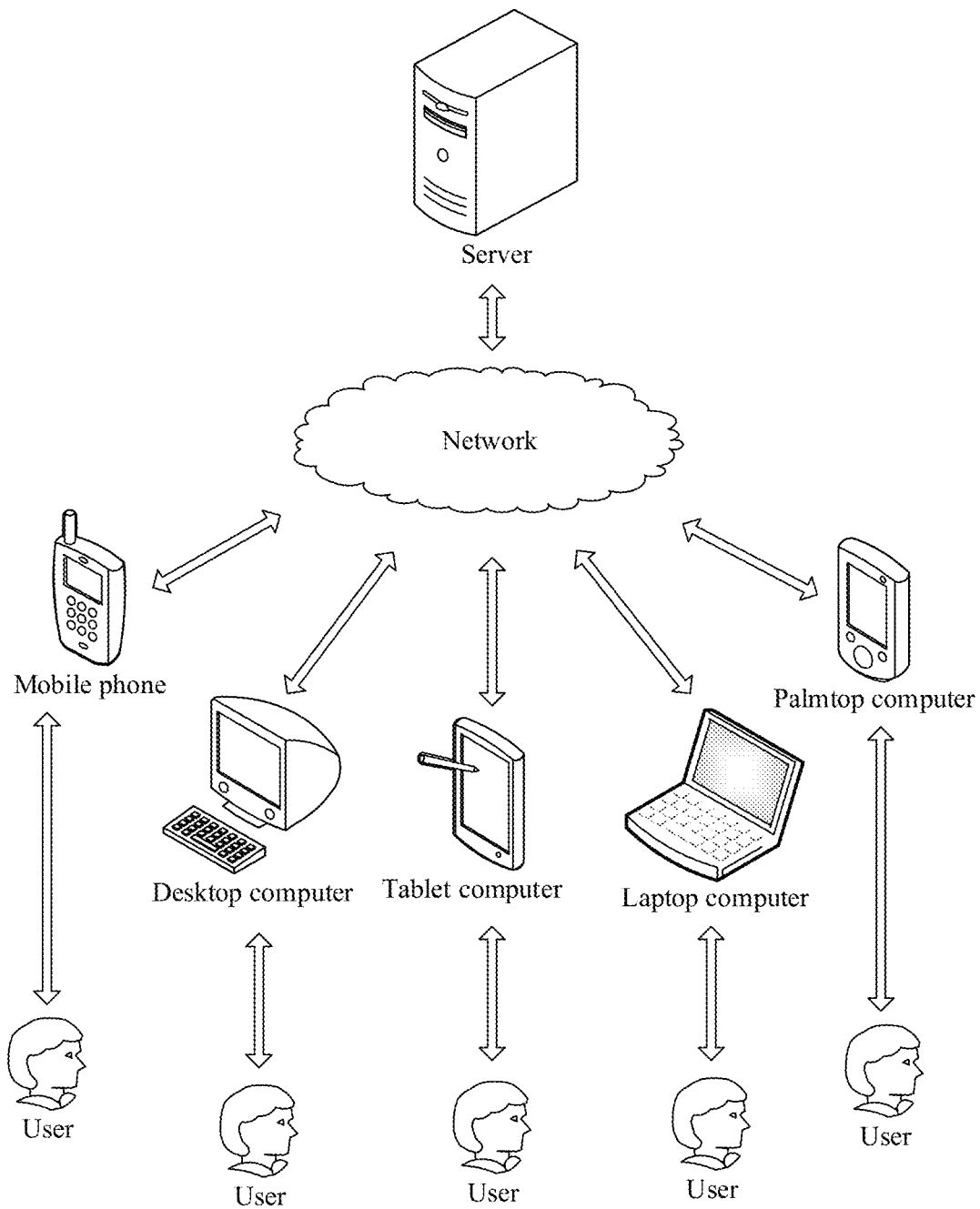
FIG. 1 is a network architecture diagram of an audio signal processing system in running.

The embodiments of this application provide an audio signal processing method and a related apparatus, which may be applied to a system or a program including an audio signal processing function in a terminal device. A first audio input signal is obtained; then the first audio input signal is inputted into a machine learning model to obtain a first gain value for processing a frequency band of an effective audio signal; the first audio input signal is processed according to the first gain value to obtain a second audio input signal; next the second audio input signal is detected to obtain a second howling point, the second howling point being used for indicating a howling point of a frequency band corresponding to an ineffective audio signal; and the second audio input signal is processed according to a second gain value to obtain an audio output signal, the second gain value being used for indicating a suppression parameter of the second howling point. In this way, the howling is suppressed in an audio input signal at an initial stage and therefore cannot obtain a loop gain. With the aid of the correspondence of a howling point indicated in the machine learning model, the convenience of model calculation, and further processing on an unprocessed howling point by using the second gain value, a rapid and thorough process of the howling suppression above is implemented without affecting the effective audio signal, so that the audio processing accuracy and efficiency are improved.

First, some terms that may be used in the embodiments of this application are described as follows.

Howling: a phenomenon occurring when a sound signal acquired by a microphone is amplified by a speaker, and then picked up by the microphone, causing the signal to be continuously superimposed and amplified in a feedback loop. This oscillation cycle generated by a positive feedback is referred to as howling.

Howling point: a frequency point whose loop gain is greater than or equal to 1 in an audio signal.

Effective audio signal: an indication for a target audio in the audio signal, such as a voice signal in a voice call process.

Ineffective audio signal: an indication for an interference audio in the audio signal, such as background noise or an echo.

Gain value: a degree of change in audio signal processing at a specified frequency band, used for indicating a reduction multiple of an audio signal corresponding to a howling point in a howling suppression scenario.

Pitch period: a time period for each opening and closing of vocal cords in human vocalization, that is, a parameter that may be used for indicating the effective audio signal.

Machine learning model: a model used for adjusting a parameter through a given sample, so that an output has a similar feature with the given sample.

Power spectrum: the change of signal power with frequency, that is, the distribution of signal power in a frequency domain.

Analog-to-digital converter (ADC): an electronic component configured to convert an analog signal into a digital signal.

Recurrent neural network (RNN) model: a type of RNN using data of a sequence as an input, and recurring in an evolution direction of the sequence, and in which all nodes (recurrent units) are connected in a chain.

Convolutional neural network (CNN) model: a convolutional neural network has a characterization learning capability and can classify input information in a translation-invariant manner according to a hierarchical structure thereof.

It is to be understood that, the audio signal processing method provided by this application may be applied to a system or a program including an audio signal processing function in a terminal device, for example, as a game voice plug-in. Specifically, an audio signal processing system may be run in a network architecture shown in FIG. 1. FIG. 1 is a network architecture diagram of an audio signal processing system in running. As shown in the figure, the audio signal processing system can perform audio signal processing on a plurality of information sources. A terminal is connected to a server through a network to receive an audio signal sent by another terminal, and perform the audio signal processing method provided by this application on the received signal to suppress howling and obtain an audio output, so that an audio interaction process between a plurality of terminals is implemented. It can be understood that a variety of terminal devices are shown in FIG. 1. In one embodiment, more or fewer types of terminal devices may be involved in an audio signal processing process, and the specific number and types depend on the embodiment, which is not limited herein. In addition, one server is shown in FIG. 1, but in one embodiment, a plurality of servers may be involved, especially in a scenario in which a plurality of content applications interact with each other, and the specific number of servers depends on the embodiment.

The audio signal processing method provided in this embodiment may also be performed offline, that is, without the involvement of the server. In this case, the terminal performs audio signal interaction with another terminal locally, and then performs an audio signal processing process between the terminals.

It can be understood that, the audio signal processing system above may be run on a personal mobile terminal, for example, as an application such as a game voice plug-in, or may be run on a server, or a third-party device to perform audio signal processing to obtain an audio signal processing result of an information source. The specific audio signal processing system may be run in the foregoing devices as a program, or be run in the foregoing devices as a system component, or may be used as a type of cloud service program. The specific operation mode depends on one embodiment, which is not limited herein.

With the development of technologies related to mobile terminals, more smart devices appear in people's daily life, where making a voice call through a smart device is particularly prominent. However, during a call process, a microphone at a local terminal also acquires an audio signal of a speaker at an opposite terminal, causing the audio signal to loop in the voice process between the local terminal and the opposite terminal. Especially during a short-range voice process, the audio signal continuously obtains a loop gain, resulting in howling.

Generally, a frequency shifter or a phase shifter may be used for processing an input audio at a local terminal, that is, audio information consistent with a phase of howling is destroyed to suppress the howling.

However, the method by using a frequency shifter or a phase shifter requires a long processing time for and is not suitable for real-time processing of a voice call. Moreover, the removal of a fixed phase of a howling point causes damage to the sound quality of an effective audio and affects the audio processing accuracy.

Figure 2:
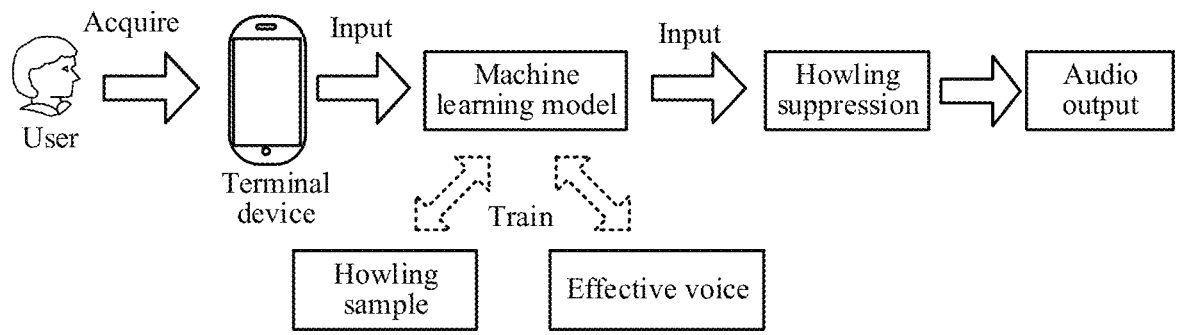
FIG. 2 is a process architecture diagram of audio signal processing according to an embodiment of this application.

This application provides an audio signal processing method, which is applied to a process framework of audio signal processing shown in FIG. 2. FIG. 2 is a process architecture diagram of audio signal processing according to an embodiment of this application. First, a terminal device acquires voice of a user and converts the voice into an audio signal, then inputs the audio signal into a trained machine learning model to filter and suppress a howling point, and further controls the gain of an unprocessed howling point to obtain an audio signal after howling suppression as an output.

It can be understood that, the method provided by this application may be writing of a program, which is used as a processing logic in a hardware system, or as an audio signal processing apparatus, to implement the processing logic above in an integrated or externally connected manner. As an implementation, the audio signal processing apparatus obtains a first audio input signal; then inputs the first audio input signal into a machine learning model to obtain a first gain value for processing a frequency band of an effective audio signal; processes the first audio input signal according to the first gain value to obtain a second audio input signal; next detects the second audio input signal to obtain a second howling point, the second howling point being used for indicating a howling point of a frequency band corresponding to an audio signal other than the effective audio signal; and processes the second audio input signal according to a second gain value to obtain an audio output signal, the second gain value being used for indicating a suppression parameter of the second howling point. In this way, the howling is suppressed in an audio input signal at an initial stage and therefore cannot obtain a loop gain. With the aid of the correspondence of a howling point indicated in the machine learning model, the convenience of model calculation, and further processing on an unprocessed howling point by using the second gain value, a rapid and thorough process of the howling suppression above is implemented without affecting the effective audio signal, so that the audio processing accuracy and efficiency are improved.

Figure 3:
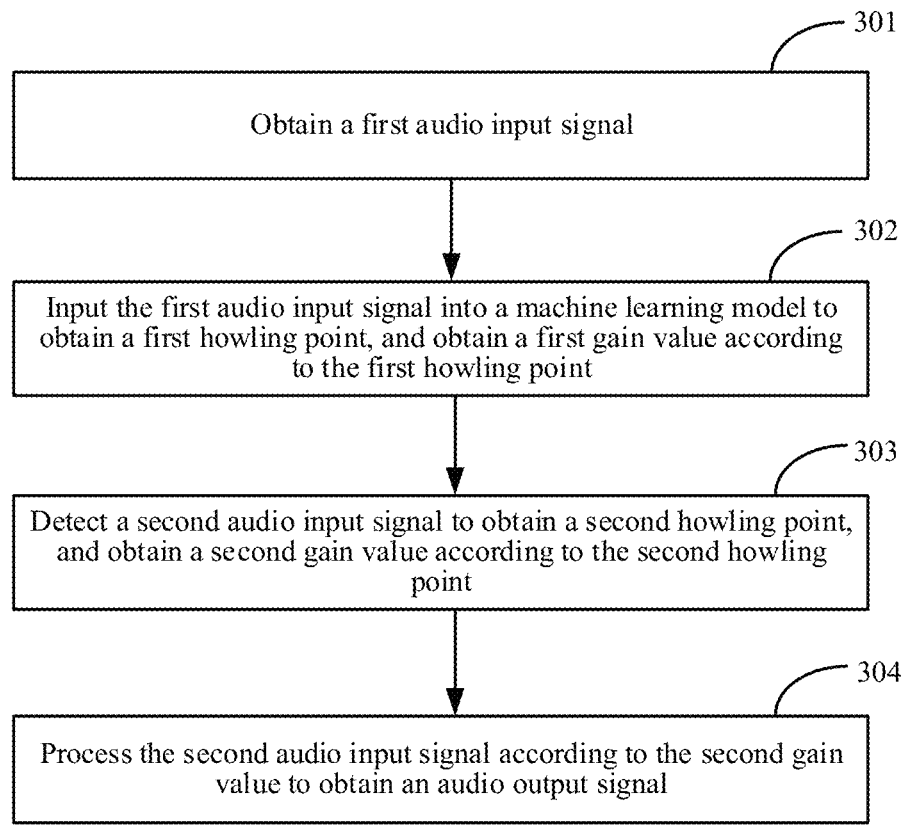
FIG. 3 is a flowchart of an audio signal processing method according to an embodiment of this application.

With reference to the process architecture above, the audio signal processing method in this application is described below. FIG. 3 is a flowchart of an audio signal processing method according to an embodiment of this application, and the method includes at least the following steps:

301: Obtain a first audio input signal.

In this embodiment, the first audio input signal may be an initial audio signal when a voice call is started, or may be an audio signal after a period of time of a call. Specifically, the generation of howling is a process in which an audio signal is continuously gaining in a feedback loop, that is, a process of feedback gain accumulation. The feedback loop is a loop including a microphone at a local terminal and a speaker at an opposite terminal. Therefore, an audio signal of a different time period may accumulate a different feedback gain, which can invoke the audio signal processing method provided by this application immediately, or invoke the audio signal processing method provided by this application after the feedback gain becomes greater than or equal to 1 because the generation of howling requires a feedback gain in a loop of an audio signal to be greater than or equal to 1.

In some embodiments, the first audio input signal obtained may be a signal preliminarily amplified. Specifically, an acquired signal is obtained first, and the acquired signal may be acquired by a microphone or another acquisition device. Then, the acquired signal is converted into a digital signal, for example, by an ADC. Further, the digital signal is inputted to an amplifier to obtain the first audio input signal. Because the first audio input signal is amplified, it is convenient for a user to listen and convenient for a subsequent howling point filtering process of this application.

In addition, the acquired signal acquired by an acquisition device may include obvious noise, for example: a signal with a frequency far greater than a voice range. In this case, noise filtering may be performed preliminarily. Specifically, the digital signal is inputted into an amplifier to obtain an amplified signal; then the amplified signal is processed according to a filter parameter to obtain a filtered amplified signal; and the filtered amplified signal is further Fourier transformed into a frequency domain to obtain the first audio input signal. The filter parameter may be a fixed value, or may be a targeted setting according to a frequency band corresponding to common noise in a historical record.

302: Input the first audio input signal into a machine learning model to obtain a first howling point, and obtain a first gain value according to the first howling point.

In this embodiment, the first howling point is used for indicating a howling point of a frequency band corresponding to an effective audio signal in the first audio input signal; and the first gain value is used for indicating a suppression parameter of the first howling point. The first audio input signal is processed according to the first gain value to obtain a second audio input signal. In addition, the machine learning model is trained based on a plurality of training signals, the training signals include a plurality of howling point samples, and the first howling point is used for indicating the howling point of the frequency band corresponding to the effective audio signal.

Because there are some differences in frequency band distribution or energy features between howling points and effective voices, extraction may be performed by determining a plurality of features in an audio input signal. These features may be selected based on features, for example, frequency band distribution, a position of a pitch period, or a signal fluctuation frequency, of the effective audio signal, and then be inputted into the machine learning model to determine a corresponding first howling point. According to the first howling point, a corresponding first gain value is determined.

Specifically, the feature extraction may be performed based on the effective audio signal. According to a first aspect, the feature extraction is performed based on parameter feature information of the effective audio signal, for example, a Mel-scale frequency cepstral coefficient (MFCC) of the effective audio signal, or mathematical deformation based on the coefficient. According to a second aspect, the feature extraction is performed based on biological feature information of the effective audio signal, for example, a pitch period of the effective audio signal because an audio signal within 500 Hz of the human voice has a pitch period while a howling signal does not. According to a third aspect, the feature extraction is performed based on waveform feature information of the effective audio signal, for example, the fluctuation of the effective audio signal in a specific frequency band because the effective audio signal has a short-term stable feature. Through the feature extraction above, an effective audio signal and a signal corresponding to a howling point can be well distinguished, so that the features of the effective audio signal can be learned by a machine learning model, thereby improving the accuracy of the machine learning model for extracting the effective audio signal.

The examples of the features above are only for illustration. The specific feature may be a feature indicating the effective audio signal, or a feature indicating the howling signal, or a feature distinguishing the effective audio signal from the howling signal, which is not limited herein.

In some embodiments, considering that an acquisition frequency of an input signal is different in different scenarios, the first audio input signal may be adjusted to a target frequency for transformation into the frequency domain. For example, a mobile phone voice call generally uses a sampling rate of 16 KHz. Therefore, the target frequency is adjusted to 16 KHz; then a plurality of sampling points in the first audio input signal transformed into the frequency domain are determined; and a plurality of audio features are extracted based on the sampling points. In this way, the input signal is processed in multiple threads and the audio processing efficiency is improved.

In addition, in the process of transforming the first audio input signal from a time domain into the frequency domain, to make a signal of the time domain better meet a periodicity requirement in the Fourier transform process and reduce signal omission, the input signal may be divided based on a window function, that is, the first audio input signal transformed into the frequency domain is divided based on the window function to obtain a plurality of subbands; and then a plurality of sampling points in the subbands are determined. The window function may be a rectangular window, a Gaussian window, a Kaiser window, or the like, and the specific function form depends on one embodiment.

303: Detect a second audio input signal to obtain a second howling point, and obtain a second gain value according to the second howling point.

In this embodiment, the first gain value corresponds to a plurality of howling points in the first audio input signal, each howling point corresponds to a plurality of frequency bands, and a set of these frequency bands is called a subband. Therefore, the first gain value may include a plurality of gain values for howling suppression, and each gain for howling suppression is a floating-point number from 0 to 1. The first gain value is inputted into the first audio input signal, and each subband is multiplied by an attenuation gain of a corresponding subband for howling suppression to obtain a result, that is, the second audio input signal, after the machine learns howling suppression processing.

It can be understood that, the second howling point is used for indicating a howling point of a frequency band corresponding to an ineffective audio signal in the second audio input signal, that is, the howling point that does not belong to the frequency band corresponding to the effective audio signal. Because there may be a howling point corresponding to a frequency band of an unprocessed noise signal in machine model training, a secondary gain process is performed, that is, the second howling point may be detected.

Specifically, the second howling point may be detected by obtaining a power spectrum corresponding to the second audio input signal; then detecting an extreme value in the power spectrum, for example: a maximum power value in the power spectrum, or a value range set based on the maximum power value; then determining a corresponding candidate frequency point, which may be a howling point, according to the extreme value; and determining the second howling point according to the candidate frequency point. That is, phase and feedback gain information of the candidate frequency point are detected, and when the phase is consistent and the feedback gain is greater than or equal to 1, the candidate frequency point is determined as the second howling point. Through the determining of the extreme value in the power spectrum, the gain change of a frequency point can be visually determined because the power corresponding to a howling point is usually greater than the power of a general frequency point, so that the howling point recognition accuracy is improved.

In some embodiments, the second howling point may be determined based on a peak-to-average ratio, that is, a plurality of frequency points adjacent to the candidate frequency point are obtained to determine a candidate range; then an average frequency value of the frequency points in the candidate range is determined to obtain the peak-to-average ratio; and when the peak-to-average ratio is greater than a howling threshold, the candidate frequency point is determined as the second howling point. To avoid the impact of the extreme value caused by an accident on a recognition process, the howling points may be determined by the peak-to-average ratio, so that a data reference range is expanded and the howling point recognition accuracy is further improved.

In some embodiments, because the howling points may appear periodically, the howling points may also be determined by statistical analysis based on a historical record. For example, in a possible scenario, the howling points tend to be concentrated in a frequency band above 2 KHz, and the energy of the voice signal is mainly concentrated in a frequency band below 2 KHz. Then the howling points are determined based on the peak-to-average ratio; or may be further checked based on a location where the howling points appear in the historical record. For example, when the howling points are concentrated in 2 KHz to 3 KHz in the historical record, secondary detection is performed on the range in the next howling point recognition. For the specific check method, reference may be made to the recognition method of the extreme value of the power spectrum or the peak-to-average ratio above.

It can be understood that, the frequency band where the howling points are concentrated depends on a specific scenario, that is, in different scenarios, the frequency band where the howling points are concentrated may be higher or lower, and only a method for obtaining the howling points based on analysis of the historical record is described, which is not limited herein.

304: Process the second audio input signal according to the second gain value to obtain an audio output signal.

In this embodiment, the second gain value is used for indicating a suppression parameter of the second howling point, that is, a reduction multiple of a frequency band corresponding to the second howling point. The secondary howling point filtering ensures the accuracy and the significant effect of howling suppression. The second gain value may be empirically set to a floating-point value ranging from 0 to 1, or may be calculated based on the energy of upper and lower adjacent subbands.

In addition, after the second audio input signal is processed according to the second gain value, a processed signal may be transformed into a time domain, and be notch processed, which is a type of filter, to further eliminate the howling points.

With reference to the foregoing embodiments, it can be seen that, a first audio input signal is obtained; then the first audio input signal is inputted into a machine learning model to obtain a first gain value for processing a frequency band of an effective audio signal; the first audio input signal is processed according to the first gain value to obtain a second audio input signal; next the second audio input signal is detected to obtain a second howling point, the second howling point being used for indicating a howling point of a frequency band corresponding to an ineffective audio signal in the second audio input signal; and the second audio input signal is processed according to a second gain value to obtain an audio output signal, the second gain value being used for indicating a suppression parameter of the second howling point. In this way, the howling is suppressed in an audio input signal at an initial stage and therefore cannot obtain a loop gain. With the aid of the correspondence of a howling point indicated in the machine learning model, the convenience of model calculation, and further processing on an unprocessed howling point by using the second gain value, a rapid and thorough process of the howling suppression above is implemented without affecting the effective audio signal, so that the audio processing accuracy and efficiency are improved.

Figure 4:
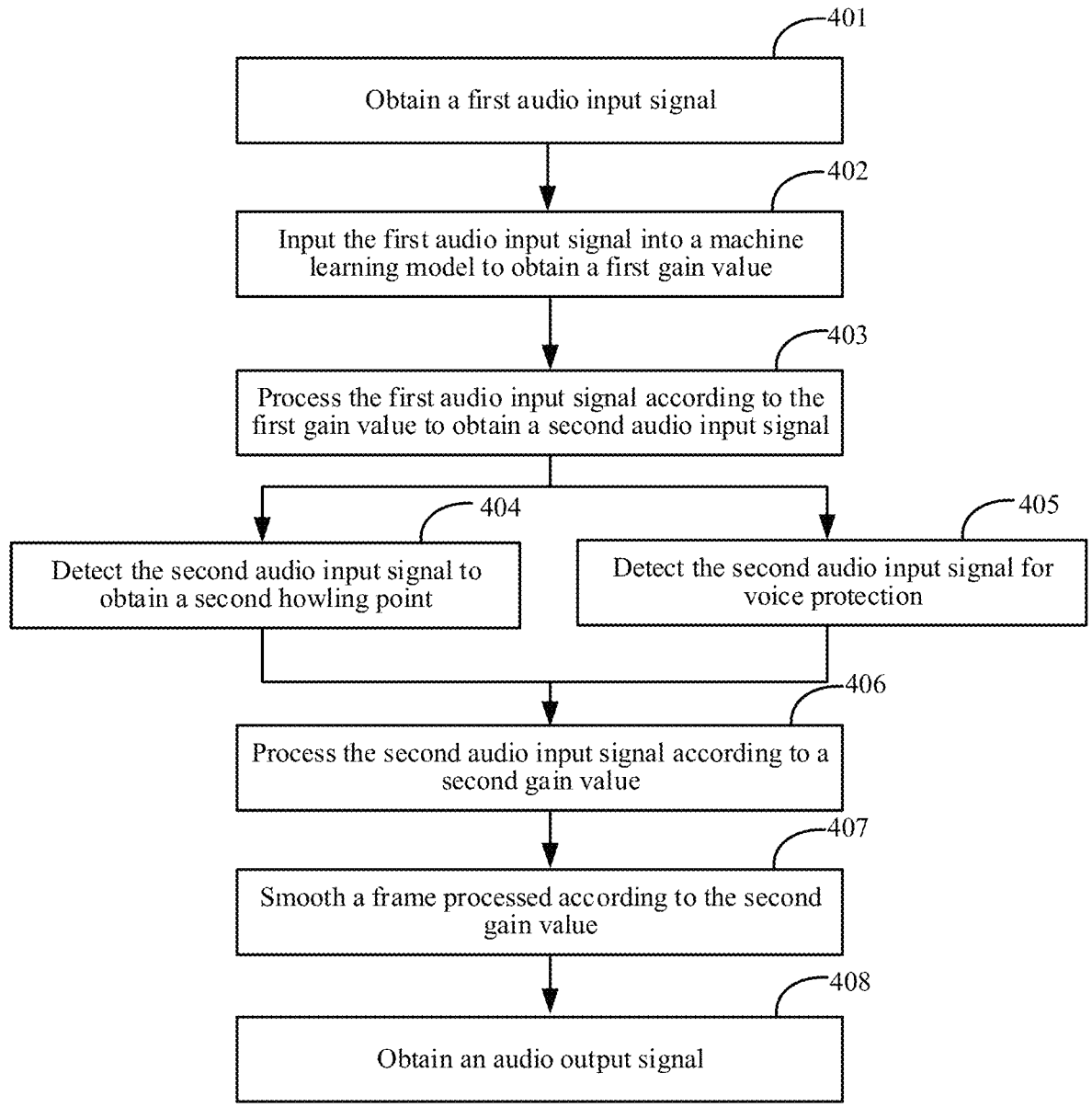
FIG. 4 is a flowchart of another audio signal processing method according to an embodiment of this application.

In the foregoing embodiments, the audio signal processing process is described. However, the effective audio signal may be affected in the secondary howling suppression. To avoid such a situation, reference is made to FIG. 4. FIG. 4 is a flowchart of another audio signal processing method according to an embodiment of this application, and the method includes at least the following steps:

401: Obtain a first audio input signal.

402: Input the first audio input signal into a machine learning model to obtain a first gain value.

403: Process the first audio input signal according to the first gain value to obtain a second audio input signal.

404: Detect the second audio input signal to obtain a second howling point.

In this embodiment, steps 401 to 404 are similar to steps 301 to 304 in the embodiment of FIG. 3, and for related features and description, reference may be made to the above, which are not repeated herein.

405: Detect the second audio input signal for voice protection.

In this embodiment, the voice protection is to ensure the integrity of an effective audio signal. Specifically, feature information in the effective audio signal is first obtained, the feature information being determined based on a waveform feature indicated by the effective audio signal. For example, when a voiced sound has formants in the waveform feature indicated by the effective audio signal, and the high-frequency energy of an unvoiced sound is large and an energy slope thereof is stable according to a frequency axis, the corresponding effective audio signal in the second audio input signal is detected according to the feature information. A lock operation is further performed on the effective audio signal, the lock operation being used for indicating an object on which the second gain value does not apply, that is, a processing frequency band corresponding to the second gain value may include an effective audio signal locked in this step, on which no gain processing is performed.

In some embodiments, the voice protection for the effective audio signal may also be performed based on a historical record used for indicating a voice frequency band, that is, frequency band distribution of the effective audio signal is counted, and frequency bands with a large distribution weight are detected and filtered one by one.

406: Process the second audio input signal according to a second gain value.

407: Smooth a frame processed according to the second gain value.

In this embodiment, to prevent an excessively large difference of suppression gains between frames from causing a harsh audio output signal, that is, an abrupt audio change, a plurality of gain frames corresponding to howling points corresponding to the second gain value may be smoothed. Specifically, a formula below may be used for processing the gain frames and adjacent frames:

$$\tilde{g}ain2(m,k)=\alpha*\tilde{g}ain2(m-1,k)+(1-\alpha)gain2(m,k)$$

where $\alpha$ is a smooth factor ranging from 0 to 1; $\tilde{g}ain2(m-1,k)$ is a suppression gain of a previous frame; m is a frame index; and k is a frequency point index. In the formula above, by adjusting a gain difference between adjacent frames, the gain between the adjacent frames is more in linear distribution, the abrupt audio change is reduced, the audio output signal sounds smoother, and user experience is improved.

408: Obtain an audio output signal.

In this embodiment, the audio output signal is obtained by multiplying the gain parameter $\tilde{g}ain2(m,k)$ in step 407 by a value of a corresponding frequency point.

With reference to the foregoing embodiments, it can be seen that, the accuracy and clarity of the audio output signal are improved by detecting and locking the effective audio signal. In addition, by smoothing the gain parameter of adjacent gain frames, the gain between the adjacent frames is more in the linear distribution, the abrupt audio change is reduced, the audio output signal sounds smoother, and the user experience is improved.

Figure 5:
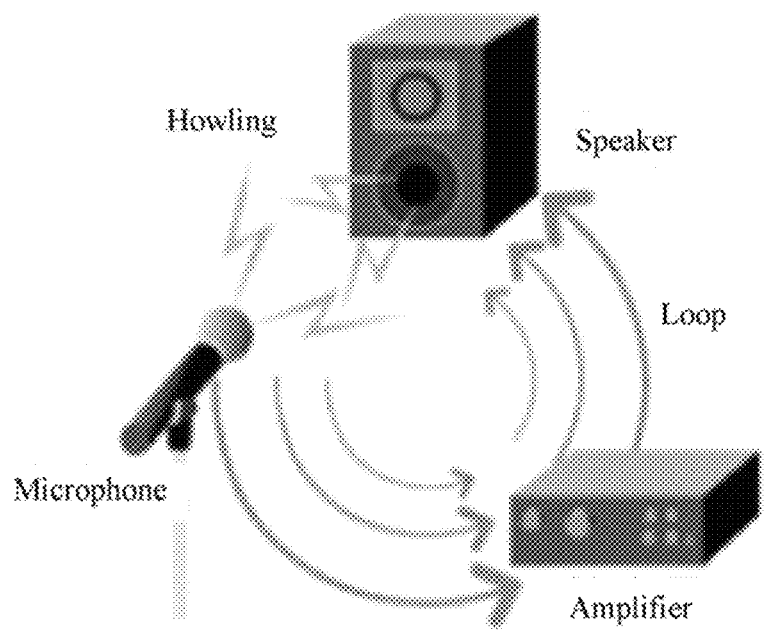
FIG. 5 is a schematic diagram of a scenario for audio signal processing according to an embodiment of this application.

In the foregoing embodiments, the audio processing method for howling suppression is described. With reference to specific scenarios, the audio processing method for howling suppression is described below. FIG. 5 is a schematic diagram of a scenario for audio signal processing according to an embodiment of this application. The figure shows a scenario in which a microphone acquires and amplifies a voice signal for playback. Because a sound source (microphone) is too close to an amplification device (speaker), the sound signal acquired by the microphone is amplified by the speaker, and then picked up by the microphone, causing the signal to be continuously superimposed and amplified in a feedback loop, and an oscillation cycle to be generated by a positive feedback, which results in howling. A function of the positive feedback generating oscillation may be:

$$H(s) = \frac{G(s)}{1 - G(s)F(s)}$$

Correspondingly, the generation of howling requires that a phase of an input signal acquired by the microphone in the feedback loop is the same as a phase of a sound wave signal fed back to the speaker, that is:

$$\angle G(\omega_0)F(\omega_0)=n*2\pi$$

A feedback loop gain is greater than or equal to 1, that is:

$$|G(\omega_0)F(\omega_0)| \geq 1$$

where G(s) is the input signal acquired by the microphone; F(s) is the sound wave signal fed back to the speaker; G(w0) is the phase of the input signal acquired by the microphone; F(w0) is the phase of the sound wave signal fed back to the speaker; and n is an integer parameter.

In this scenario, the audio signal processing method provided by this application may be performed in an amplifier, that is, after an audio signal acquired by the microphone is transmitted to the amplifier, the audio signal processing process shown in the embodiments of FIG. 3 or FIG. 4 is immediately performed, and then an output signal is transmitted to the speaker for playback. As this cycle repeats, the howling can be suppressed.

Figure 6:
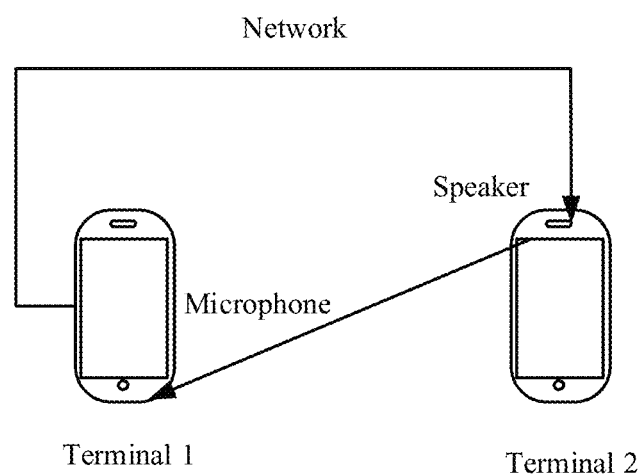
FIG. 6 is a schematic diagram of another scenario for audio signal processing according to an embodiment of this application.

In another possible scenario, FIG. 6 is a schematic diagram of another scenario for audio signal processing according to an embodiment of this application, a loop in a scenario in which a terminal is put outside is shown. When two terminals are relatively close, the sound comes out from the speaker at a right terminal, is picked up by the microphone at a left terminal, sent to the right terminal through a network after pre-processing and signal conversion, and then picked up by the microphone at the left terminal after being played through the speaker. As this cycle repeats, when a loop gain is greater than or equal to 1 at a certain frequency point, and the phase is positive, a howling point is formed at this point.

Figure 7:
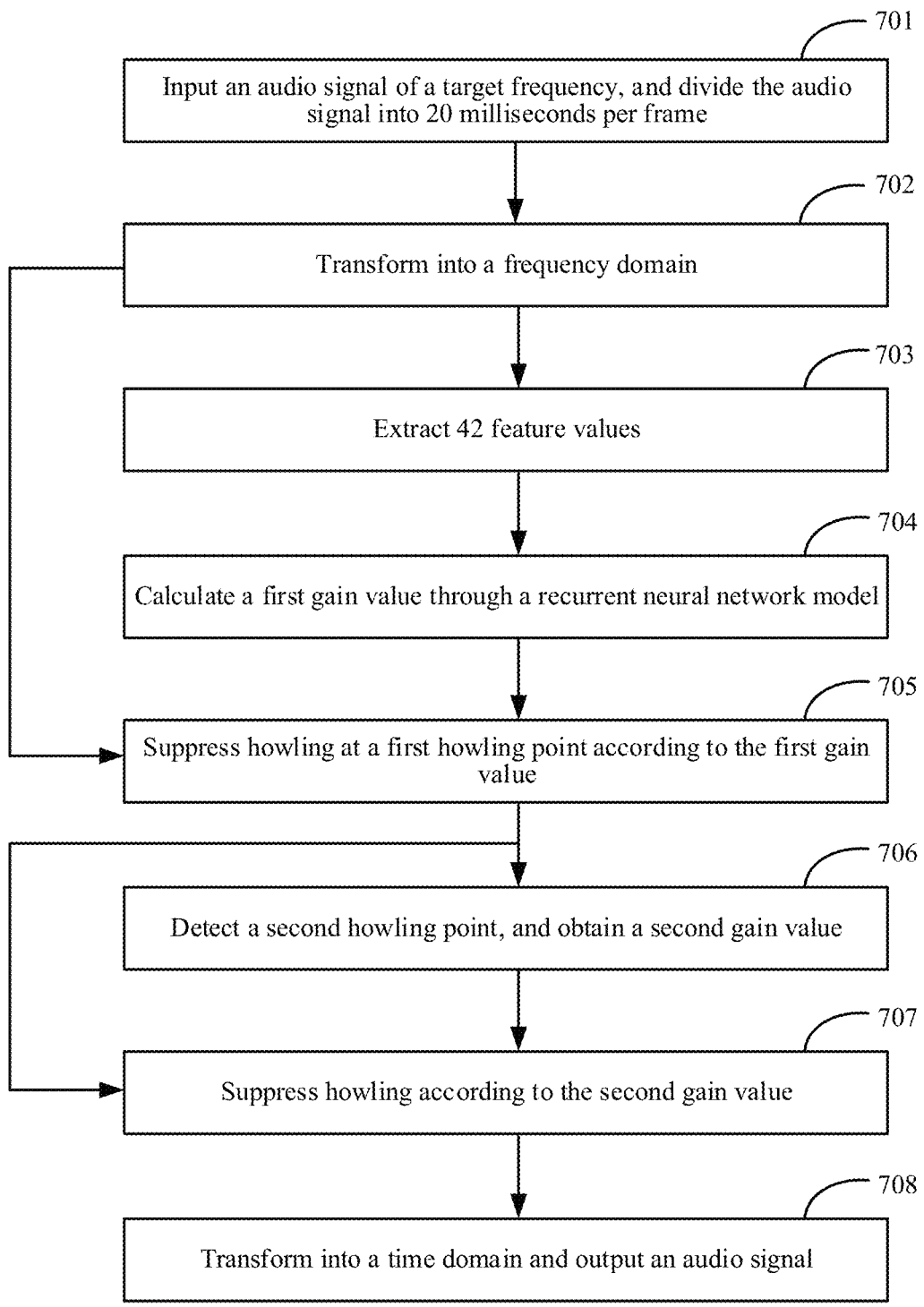
FIG. 7 is a flowchart of another audio signal processing method according to an embodiment of this application.

With reference to a specific example, the howling suppression is described below. FIG. 7 is a flowchart of another audio signal processing method according to an embodiment of this application, and the method includes at least the following steps:

701: Input an audio signal of a target frequency, and divide the audio signal into 20 milliseconds per frame.

In this embodiment, considering that a mobile phone voice call is generally processed at a sampling rate of 16 KHz, the target frequency may be set to 16 KHz.

702: Transform into a frequency domain.

In this embodiment, the audio signal is windowed and Fourier transformed into the frequency domain. The window function may be a rectangular window, a Gaussian window, a Kaiser window, or the like, and the specific function form depends on one embodiment.

703: Extract 42 feature values.

In this embodiment, the feature values may include 22 MFCCs, and for the coefficients, reference may be made to a parameter in a voice recognition process, that is, the effective audio signal; the feature values may also include first-order or second-order derivatives of the first 6 coefficients used for indicating voice features; the feature values may further include a pitch period because a voiced sound of a voice signal within 500 Hz has a pitch period while a howling signal does not; and the feature values may further include the detection of a non-stable feature value because the voice is short-term stable.

704: Calculate a first gain value through a RNN model.

In this embodiment, the machine learning model adopts the RNN model for modeling time series rather than for considering only input and output frames. The specific process of obtaining the first gain value is similar to step 302 in the embodiment of FIG. 3, which is not repeated herein.

705: Suppress howling at a first howling point according to the first gain value.

706: Detect a second howling point, and obtain a second gain value.

707. Suppress howling according to the second gain value.

708: Transform into a time domain and output an audio signal.

In this embodiment, steps 705-708 are similar to steps 303-305 in the embodiment of FIG. 3, and for related features and descriptions, reference may be made to the above, which are not repeated herein.

Figure 8:
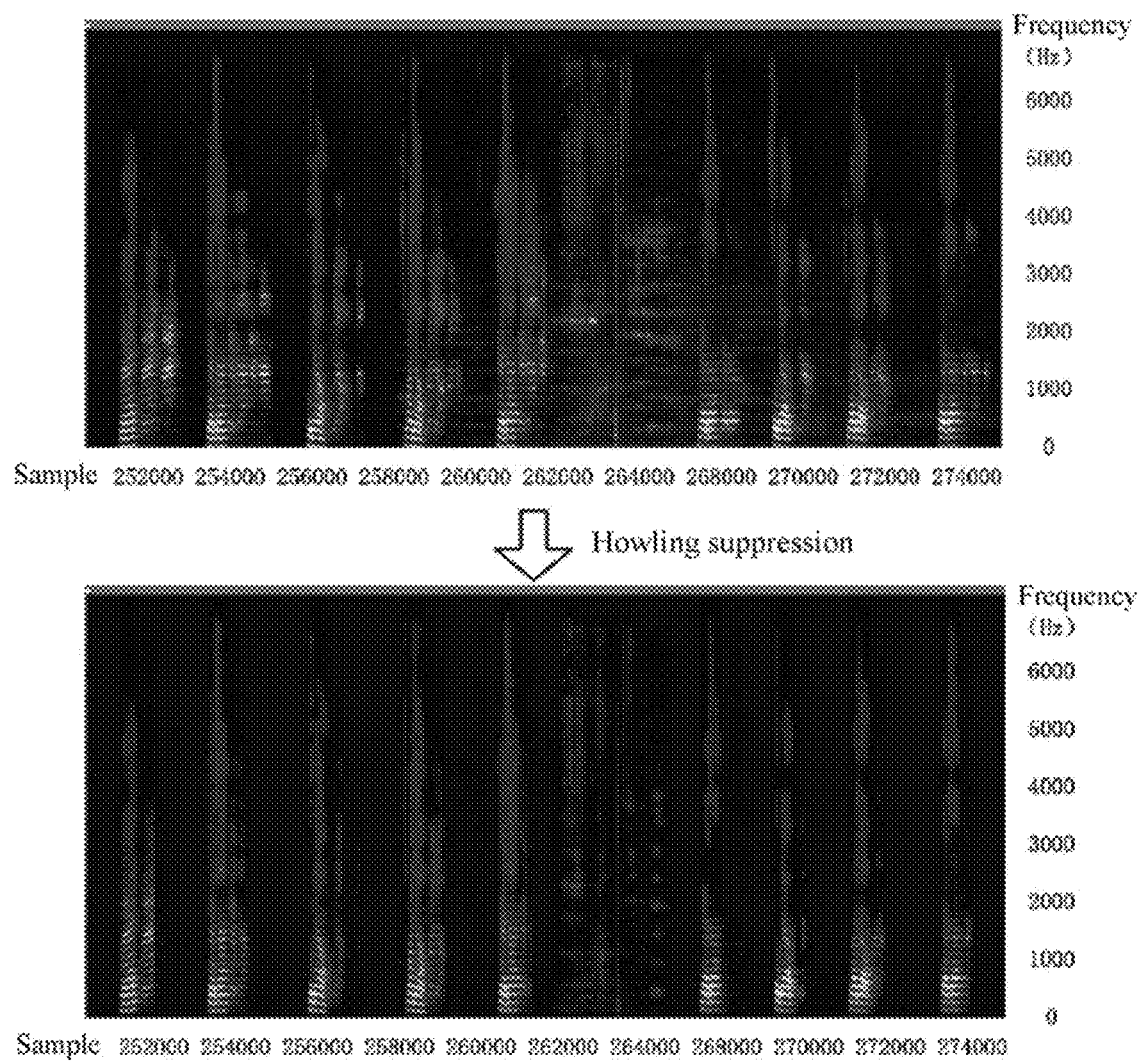
FIG. 8 is a comparison diagram of audio signal processing according to an embodiment of this application.

With reference to the foregoing embodiments, a howling suppression result shown in FIG. 8 can be obtained. FIG. 8 is a comparison diagram of audio signal processing according to an embodiment of this application, where an upper picture is a spectrogram of the signal inputted before the howling suppression, and a lower picture is a spectrogram of the signal after the howling suppression. By comparison, it can be seen that, the clutter around the peak of the sample is significantly reduced, that is, howling has been suppressed by the audio processing method provided in this application before the howling is generated.

Figure 9:
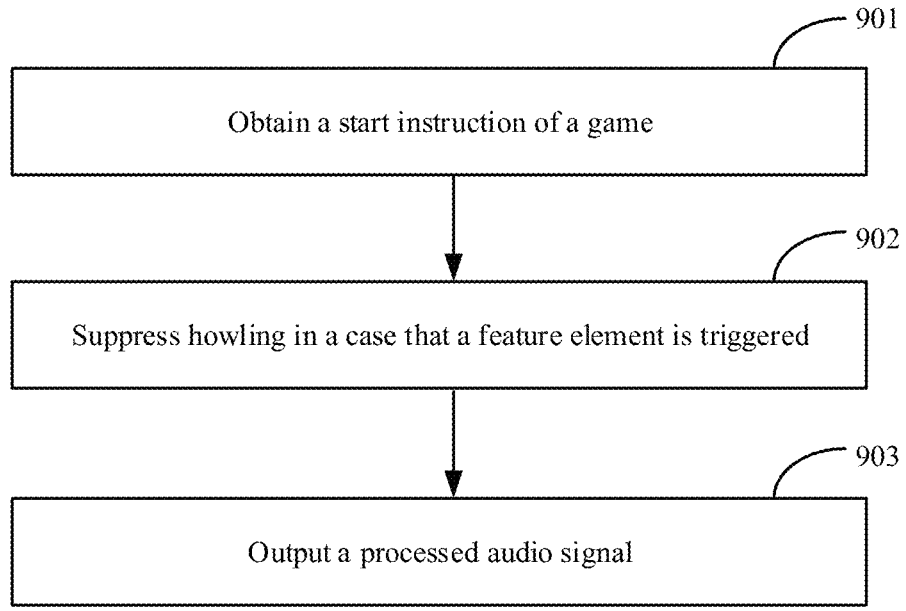
FIG. 9 is a flowchart of another audio signal processing method according to an embodiment of this application.

In the foregoing embodiments, the audio signal processing process is described. A game application is used as a specific scenario for further description below. FIG. 9 is a flowchart of another audio signal processing method according to an embodiment of this application, and the method includes at least the following steps:

901: Obtain a start instruction of a game.

In this embodiment, the start instruction of the game may be triggering of starting the game or a thread of a certain scene, for example, entering of a battle scene, in the game.

902: Suppress howling when a feature element is triggered.

Figure 10:
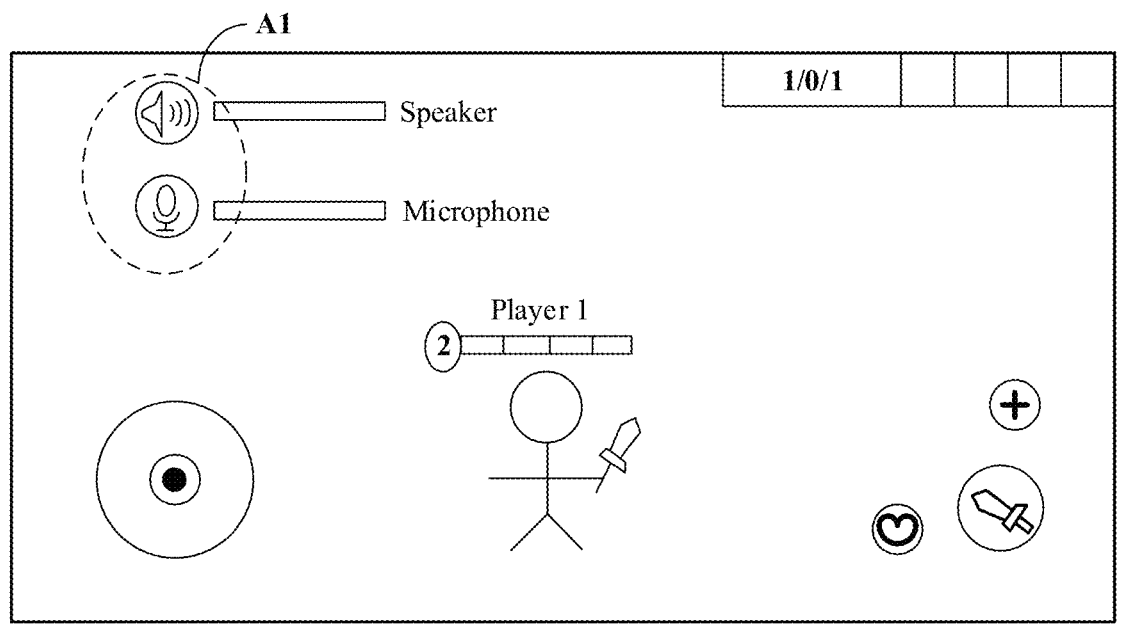
FIG. 10 is a schematic diagram of an interface of an audio signal processing method according to an embodiment of this application.

In this embodiment, the feature element is a physical or virtual button for activating a voice call function. FIG. 10 is a schematic diagram of an interface of an audio signal processing method according to an embodiment of this application. The figure shows a feature element A1 in the game interface, and when any of the buttons is triggered, the audio processing method in the embodiment of FIG. 3 or FIG. 4 is invoked.

Figure 11:
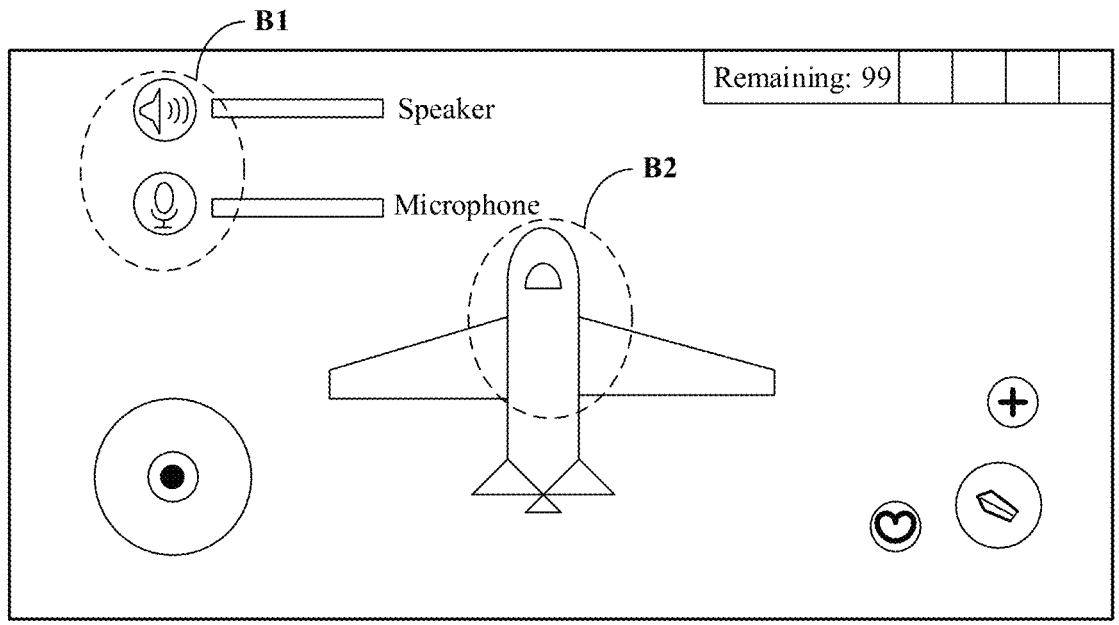
FIG. 11 is a schematic diagram of an interface of another audio signal processing method according to an embodiment of this application.

In addition, the audio processing method in this application is not only used in a voice call process between two users, but may also be applied in a voice call process between a plurality of users. FIG. 11 is a schematic diagram of an interface in another audio signal processing method according to an embodiment of this application, and a user is in a public voice scene B2 in the figure. At this time, when a feature element B1 is triggered, the audio processing method in the embodiment of FIG. 3 or FIG. 4 is invoked.

903: Output a processed audio signal.

In this embodiment, the audio signal after the howling suppression is inputted to implement a clear voice call process between two or more users.

By suppressing the howling of the audio signal between users during the game, the users can make a clearer voice call without affecting the communication due to howling, so that the user experience and the accuracy of a voice call are ensured in a game requiring a high-efficiency and high-quality voice scenario.

Figure 12:
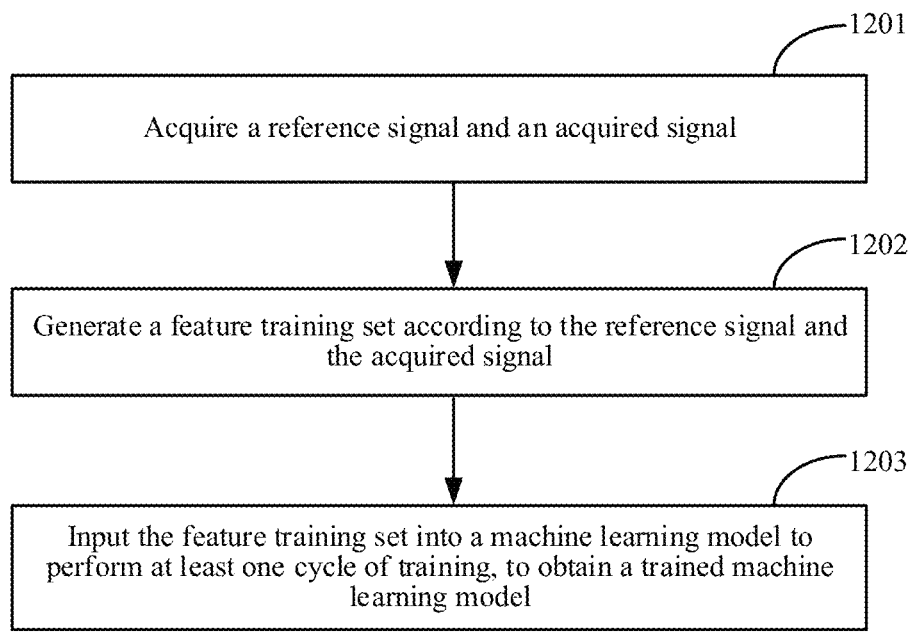
FIG. 12 is a flowchart of a machine learning model training method according to an embodiment of this application.

In the foregoing embodiments, a machine learning model is also applied, which is a pre-trained model. The method may be performed by an audio processing device, which may be a terminal device or a server. The trained machine learning model may be applied to the foregoing audio signal processing solution. The scenario is described below. FIG. 12 is a flowchart of a machine learning model training method according to an embodiment of this application, and the method includes at least the following steps:

1201: Acquire a reference signal and a voice sample signal.

In this embodiment, the reference signal is a howling signal determined based on at least two variable elements, the variable elements including a program category, a program running period, or a program running location; and the voice sample signal is used for indicating an effective voice in a voice call progress.

It can be understood that, the program category in the variable elements may be training samples in different game scenarios of different games, such as Honor of Kings or Game for Peace. The program running period indicates a time period in which the training samples are acquired. For example, in a game, a voice call function is usually activated during a time period from 8 pm to 9 pm, and the voice call is relatively intense, which may be additionally marked to generate the training samples. In addition, the program running location is geographic information of the voice acquired. For example, the training samples are acquired in a different geographic location such as a market, a classroom, or a bedroom.

The training samples are acquired under various conditions above, and the howling points in the training samples are marked, so that a generalization capability of the training samples is ensured. Because of the involvement of an acquired signal as a voice sample, the machine learning model has a good recognition capability for a howling point of a voice frequency band.

1202: Generate a feature training set according to the reference signal and the acquired signal.

In this embodiment, corresponding labels are set and classified based on the signals acquired under the different factors above, and corresponding howling points are marked to generate the feature training set.

1203: Input the feature training set into a machine learning model to perform at least one cycle of training, to obtain a trained machine learning model.

Figure 13:
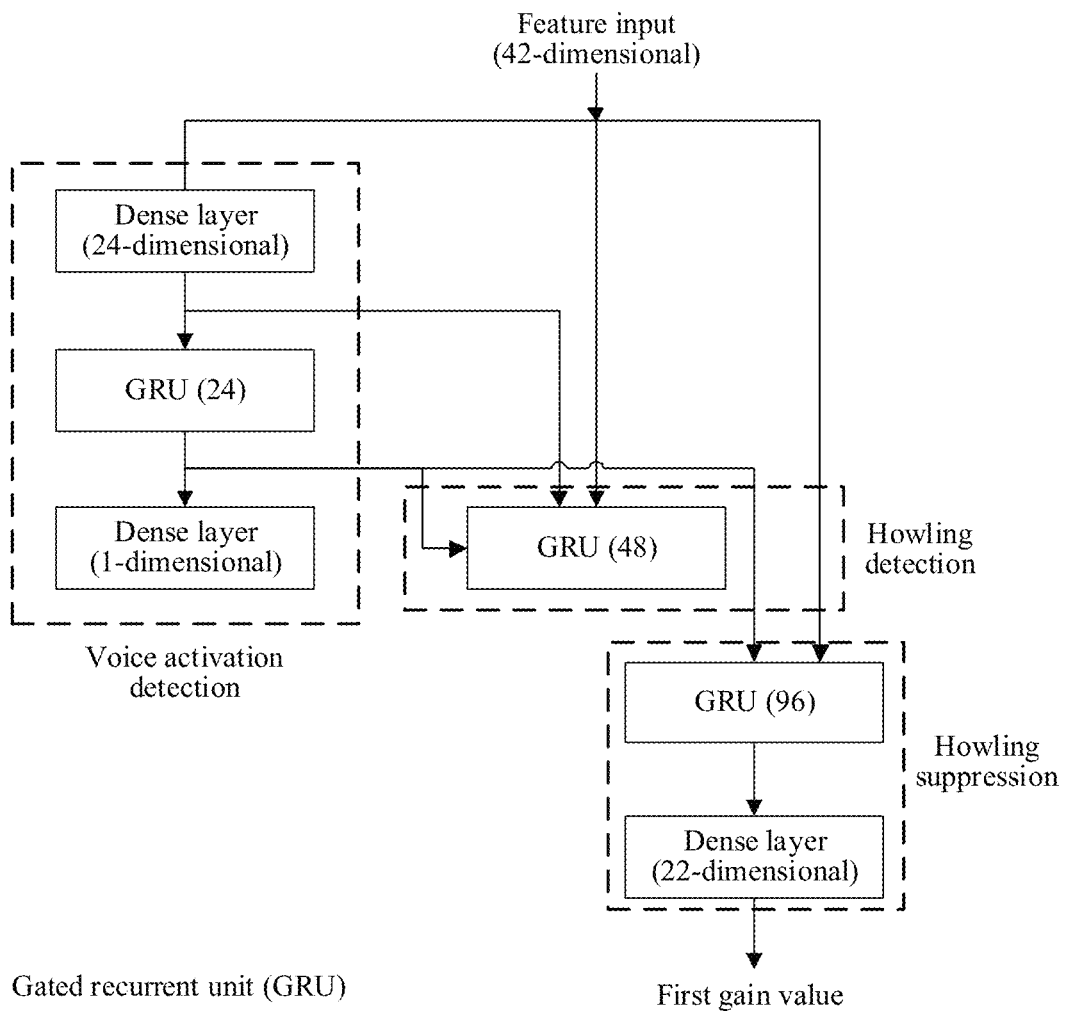
FIG. 13 is a schematic flowchart of machine learning model training according to an embodiment of this application.

In this embodiment, the trained machine learning model is used for determining a corresponding howling point and a gain value according to an audio input signal. Specifically, FIG. 13 is a schematic flowchart of machine learning model training according to an embodiment of this application. The figure shows an RNN model including a 3-level gated recurrence unit (GRU). Compared with a simple recurrence unit, the GRU has two additional gates, where a reset gate determines whether to memorize a current state for calculating a new state, and an update gate determines how to change the current state according to a new input. When the update door is closed, the GRU can remember training information for a long time. First, a first layer of the GRU inputs a 42-dimensional feature, and outputs a 24-dimensional feature and a voice activity detection (VAD) sign. A second layer of the GRU inputs the initial 42-dimensional feature and the 24-dimensional feature outputted by the first layer to output a 48-dimensional feature, for estimating a howling signal. A third layer inputs the initial 42-dimensional feature and the 42-dimensional feature outputted by the second layer to obtain an output; and adjusts the output according to a gain value in a training sample to update a model parameter, thereby implementing training of the RNN model.

The training process in this application may also be applied to a deep neural network model or a convolutional neural network model, which is not repeated herein.

Through the process of training the machine learning model, the howling point distribution and a corresponding first gain value can be obtained after the audio signal is inputted into the machine learning model, and the accuracy of howling suppression in the voice frequency band is ensured.

Figure 14:
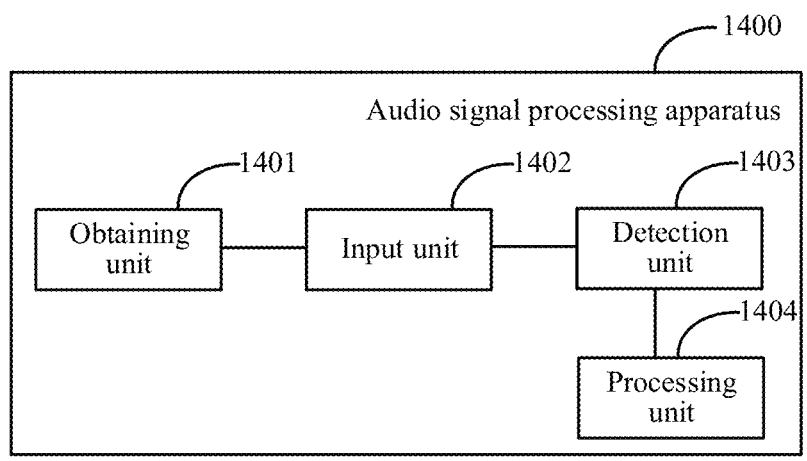
FIG. 14 is a schematic structural diagram of an audio signal processing apparatus according to an embodiment of this application.

To better implement the foregoing solutions in the embodiments of this application, a related apparatus for implementing the foregoing solutions are further provided below. FIG. 14 is a schematic structural diagram of an audio signal processing apparatus according to an embodiment of this application, and the audio signal processing apparatus 1400 includes:

an obtaining unit 1401, configured to obtain a first audio input signal;

an input unit 1402, configured to input the first audio input signal into a machine learning model to obtain a first gain value, the first gain value being used for indicating a suppression parameter of a first howling point in the first audio input signal, and the first howling point being used for indicating a howling point of a frequency band corresponding to an effective audio signal;

a detection unit 1403, configured to process the first audio input signal according to the first gain value to obtain a second audio input signal; and a processing unit 1404, configured to process the second audio input signal according to a second gain value to obtain an audio output signal, the second gain value being used for indicating a suppression parameter of a second howling point, and the second howling point being used for indicating a howling point of a frequency band corresponding to an ineffective audio signal.

In some embodiments, in some possible implementations of this application, the input unit 1402 is specifically configured to transform the audio input signal into a frequency domain, to extract a plurality of audio features, the audio features being determined based on features of the effective audio signal or a howling sample;

the input unit 1402 is specifically configured to input the audio features into the machine learning model to determine the first howling point;

the input unit 1402 is specifically configured to determine a corresponding first gain value according to the first howling point; and the input unit 1402 is specifically configured to process the first audio input signal according to the first gain value to obtain a second audio input signal.

The detection unit 1403 is configured to detect the second audio input signal to obtain a second howling point, and obtain a second gain value according to the second howling point, the second howling point being used for indicating a howling point of a frequency band corresponding to an ineffective audio signal in the second audio input signal.

The processing unit 1404 is configured to process the second audio input signal according to the second gain value to obtain an audio output signal.

In some embodiments, the input unit 1402 is specifically configured to transform the audio input signal into a frequency domain, to extract a plurality of audio features, the audio features being determined based on features of the effective audio signal or a howling sample;

the input unit 1402 is specifically configured to input the audio features into the machine learning model to determine the first howling point; and the input unit 1402 is specifically configured to obtain a corresponding first gain value according to the first howling point.

In some embodiments, in some possible implementations of this application, the input unit 1402 is specifically configured to adjust the first audio input signal to a target frequency for transformation into the frequency domain;

the input unit 1402 is specifically configured to determine a plurality of sampling points in the first audio input signal transformed into the frequency domain; and the input unit 1402 is specifically configured to extract the plurality of audio features based on the sampling points.

In some embodiments, in some possible implementations of this application, the input unit 1402 is specifically configured to divide the first audio input signal transformed into the frequency domain based on a window function to obtain a plurality of subbands; and the input unit 1402 is specifically configured to determine the plurality of sampling points in the subbands.

In some embodiments, in some possible implementations of this application, the detection unit 1403 is specifically configured to obtain a power spectrum corresponding to the second audio input signal;

the detection unit 1403 is specifically configured to detect an extreme value in the power spectrum and determine a corresponding candidate frequency point;

the detection unit 1403 is specifically configured to determine the second howling point according to the candidate frequency point; and the detection unit 1403 is specifically configured to process the second howling point according to the second gain value to obtain the audio output signal.

In some embodiments, in some possible implementations of this application, the detection unit 1403 is specifically configured to obtain a plurality of frequency points adjacent to the candidate frequency point to determine a candidate range;

the detection unit 1403 is specifically configured to determine an average frequency value of the frequency points in the candidate range to obtain a peak-to-average value ratio; and the detection unit 1403 is specifically configured to determine the candidate frequency point as the second howling point when the peak-to-average ratio is greater than a howling threshold.

In some embodiments, in some possible implementations of this application, the detection unit 1403 is further configured to obtain feature information in an effective audio signal, the feature information being determined based on a waveform feature indicated by the effective audio signal, and the effective audio signal being used for indicating a voice sample;

the detection unit 1403 is specifically configured to detect a corresponding effective audio signal in the second audio input signal according to the feature information; and the detection unit 1403 is specifically configured to perform a locking operation on the effective audio signal, the locking operation being used for indicating an object on which the second gain value does not apply.

In some embodiments, in some possible implementations of this application, the processing unit 1404 is specifically configured to determine a plurality of gain frames corresponding to the second howling point; and the processing unit 1404 is specifically configured to process the gain frames according to a smoothing formula to update the audio output signal.

In some embodiments, in some possible implementations of this application, the obtaining unit 1401 is specifically configured to obtain an acquired signal;

the obtaining unit 1401 is specifically configured to convert the acquired signal into a digital signal; and the obtaining unit 1401 is specifically configured to input the digital signal into an amplifier to obtain the first audio input signal.

In some embodiments, in some possible implementations of this application, the obtaining unit 1401 is specifically configured to input the digital signal into an amplifier to obtain an amplified signal;

the obtaining unit 1401 is specifically configured to process the amplified signal according to a filter parameter to obtain a filtered amplified signal; and the obtaining unit 1401 is specifically configured to Fourier transform the filtered amplified signal into a frequency domain to obtain the first audio input signal.

In some embodiments, in some possible implementations of this application, the audio signal processing method is applied to a voice call process of a game, and the obtaining unit 1401 is specifically configured to detect triggering of a feature element, the feature element being an element in a game interface; and the obtaining unit 1401 is specifically configured to obtain the first audio input signal when the feature element is triggered.

A first audio input signal is obtained; then the first audio input signal is inputted into a machine learning model to obtain a first gain value for processing a frequency band of an effective audio signal; the first audio input signal is processed according to the first gain value to obtain a second audio input signal; next the second audio input signal is detected to obtain a second howling point, the second howling point being used for indicating a howling point of a frequency band corresponding to an ineffective audio signal in the second audio input signal; and the second audio input signal is processed according to a second gain value to obtain an audio output signal, the second gain value being used for indicating a suppression parameter of the second howling point. In this way, the howling is suppressed in an audio input signal at an initial stage and therefore cannot obtain a loop gain. With the aid of the correspondence of a howling point indicated in the machine learning model, the convenience of model calculation, and further processing on an unprocessed howling point by using the second gain value, a rapid and thorough process of the howling suppression above is implemented without affecting the effective audio signal, so that the audio processing accuracy and efficiency are improved.

Figure 15:
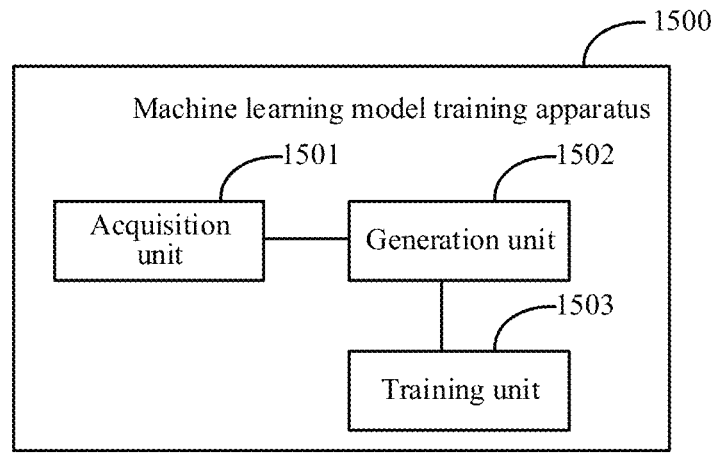
FIG. 15 is a schematic structural diagram of a machine learning model training apparatus according to an embodiment of this application.

This application further provides a machine learning model training apparatus 1500. FIG. 15 is a schematic structural diagram of a machine learning model training apparatus according to an embodiment of this application. The apparatus includes: an acquisition unit 1501, configured to acquire a reference signal and a voice sample signal, the reference signal being a howling signal determined based on at least two variable elements, the variable elements including a program category, a program running period, or a program running location, and the acquired signal being used for indicating an effective voice in a call process;

a generation unit 1502, configured to generate a feature training set according to the reference signal and the acquired signal; and a training unit 1503, configured to input the feature training set into a machine learning model for at least one cycle of training, to obtain a trained machine learning model, the trained machine learning model being used for determining a corresponding howling point and gain value according to an audio input signal.

Figure 16:
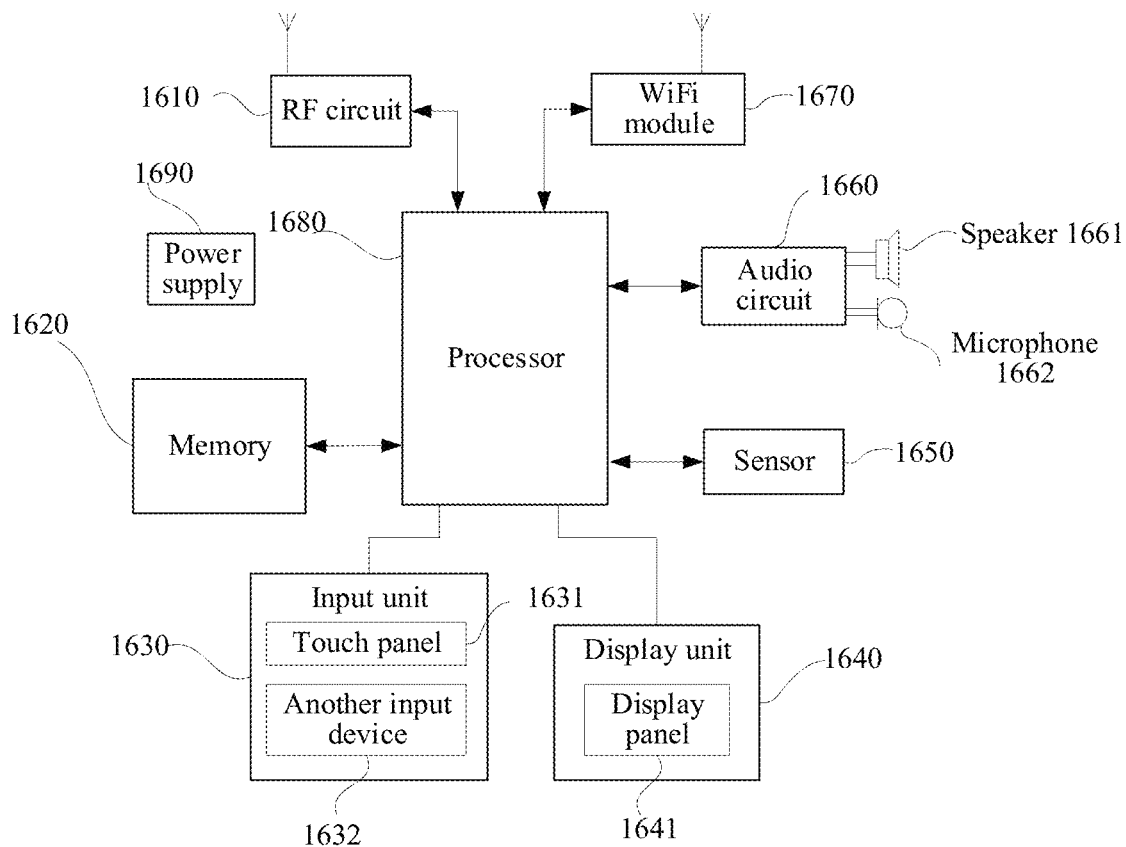
FIG. 16 is a schematic structural diagram of a terminal device according to an embodiment of this application.

The embodiments of this application further provide a terminal device. FIG. 16 is a schematic structural diagram of another terminal device according to an embodiment of this application. For ease of description, only parts related to the embodiments of this application are shown. For specific technical details that are not disclosed, refer to the method part in the embodiments of this application. The terminal may be any terminal device such as a mobile phone, a tablet computer, a personal digital assistant (PDA), a point of sales (POS), and an on-board computer. The terminal being a mobile phone is used as an example.

FIG. 16 is a block diagram of a partial structure of a mobile phone related to a terminal according to an embodiment of this application. Referring to FIG. 16, the mobile phone includes: a radio frequency (RF) circuit 1610, a memory 1620, an input unit 1630, a display unit 1640, a sensor 1650, an audio circuit 1660, a wireless fidelity (WiFi) module 1670, a processor 1680, and a power supply 1690. A person skilled in the art can understand that the structure of the mobile phone shown in FIG. 16 does not constitute a limitation on the mobile phone, and the mobile phone may include more or fewer components than those shown in the figure, or some components may be combined, or a different component deployment may be used.

The following describes the components of the mobile phone in detail with reference to FIG. 16.

The RF circuit 1610 may be configured to receive and send signals during an information receiving and sending process or a call process. Specifically, the RF circuit 1610 receives downlink information from a base station, then delivers the downlink information to the processor 1680 for processing, and sends designed uplink data to the base station. Usually, the RF circuit 1610 includes, but is not limited to, an antenna, at least one amplifier, a transceiver, a coupler, a low noise amplifier (LNA), and a duplexer. In addition, the RF circuit 1610 may also communicate with a network and another device through wireless communication.

The memory 1620 may be configured to store a software program and a module. The processor 1680 runs the software program and the module stored in the memory 1620, to implement various functional applications and data processing of the mobile phone.

The input unit 1630 may be configured to receive input digit or character information, and generate a key signal input related to the user setting and function control of the mobile phone. Specifically, the input unit 1630 may include a touch panel 1631 and another input device 1632.

The display unit 1640 may be configured to display information inputted by the user or information provided for the user, and various menus of the mobile phone.

The mobile phone may further include at least one sensor 1650 such as an optical sensor, a motion sensor, and other sensors.

The audio circuit 1660, a speaker 1661, and a microphone 1662 may provide audio interfaces between the user and the mobile phone. The audio circuit 1660 may convert received audio data into an electrical signal and transmit the electrical signal to the speaker 1661. The speaker 1661 converts the electrical signal into a sound signal for output. On the other hand, the microphone 1662 converts an acquired sound signal into an electrical signal. The audio circuit 1660 receives the electrical signal, converts the electrical signal into audio data, and outputs the audio data to the processor 1680 for processing. Then, the processor transmits the audio data to, for example, another mobile phone through the RF circuit 1610, or outputs the audio data to the memory 1620 for further processing.

WiFi is a short-range wireless transmission technology. Although FIG. 16 shows the WiFi module 1670, it can be understood that, the Wi-Fi module is not a necessary component of the mobile phone, and the Wi-Fi module may be omitted as required provided that the scope of the essence of the present disclosure is not changed.

The processor 1680 is a control center of the mobile phone, and is connected to various parts of the entire mobile phone through various interfaces and lines. By running or executing a software program and/or module stored in the memory 1620, and invoking data stored in the memory 1620, the processor performs various functions of the mobile phone and performs data processing, so that the entire mobile phone is monitored.

In the embodiments of this application, the processor 1680 included in the terminal further has a function of performing each step of the audio signal processing method or the model training method above.

Figure 17:
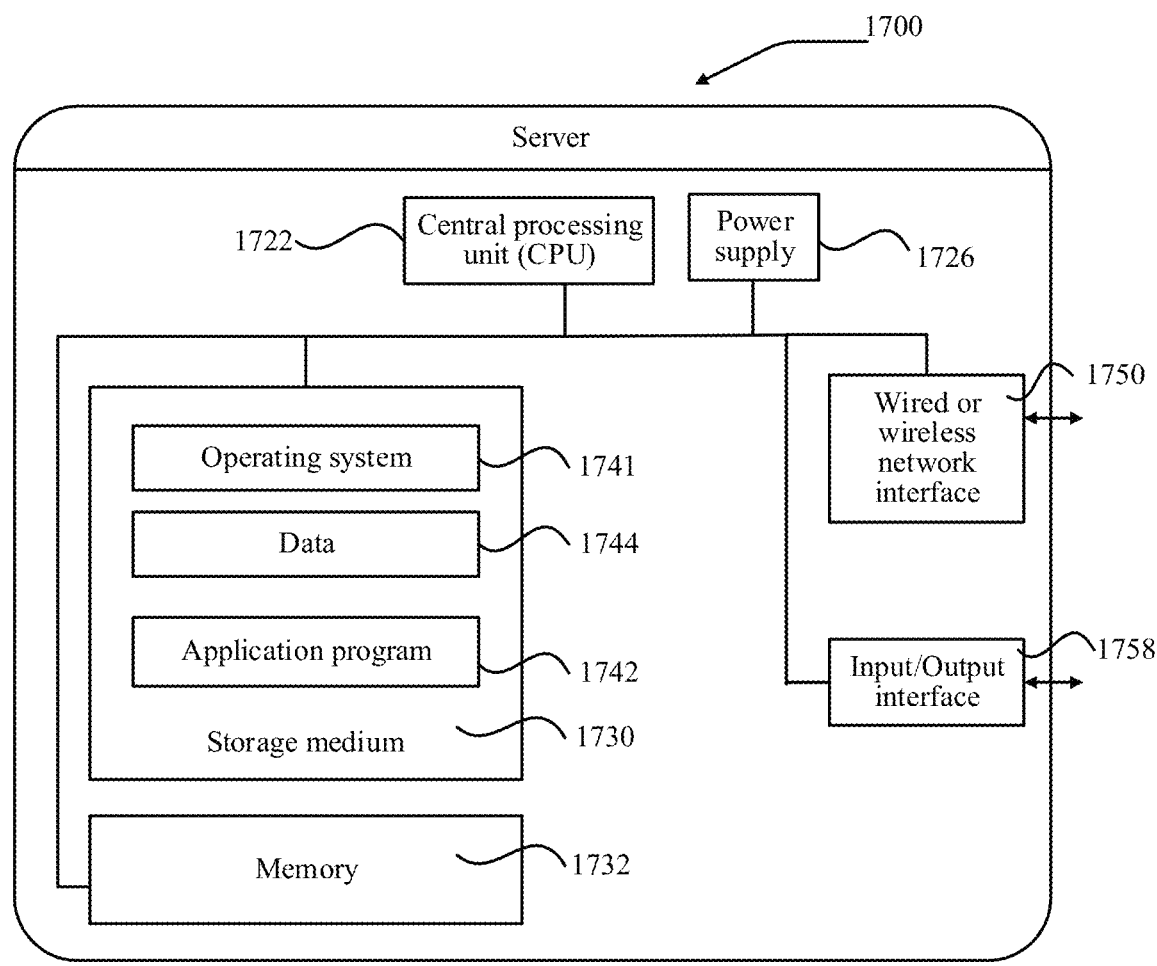
FIG. 17 is a schematic structural diagram of a server according to an embodiment of this application.

The embodiments of this application further provide a server. FIG. 17 is a schematic structural diagram of a server according to an embodiment of this application. The server 1700 may vary greatly due to different configurations or performance, and may include one or more central processing units (CPUs) 1722 and a memory 1732, and one or more storage media 1730 that store application programs 1742 or data 1744.

The server 1700 may further include one or more power supplies 1726, one or more wired or wireless network interfaces 1750, one or more input/output interfaces 1758, and/or one or more operating systems 1741.

The steps performed by the model training apparatus in the foregoing embodiments may be based on the server structure shown in FIG. 17.

The embodiments of this application further provide a computer-readable storage medium, the computer-readable storage medium storing a computer program, and the computer program being configured to perform the steps performed by the audio signal processing apparatus in the foregoing method described in the embodiments of FIG. 2 to FIG. 13.

The embodiments of this application further provide a computer program product including audio signal processing instructions, the computer program product, when run on a computer, causing the computer to perform the steps performed by the audio signal processing apparatus in the foregoing method described in the embodiments of FIG. 2 to FIG. 13.

The embodiments of this application further provide an audio signal processing system. The audio signal processing system may include the audio signal processing apparatus described in the embodiment of FIG. 14 or the terminal device in FIG. 16.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this application, it should be understood that the disclosed system, apparatus, and method may be implemented in other manners.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, an audio signal processing apparatus, a network device, or the like) to perform all or some of the steps of the methods described in the embodiments of this application.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

What is claimed is:

1. An audio signal processing method, performed by a terminal device, the method comprising:
   obtaining a first audio input signal;
   inputting the first audio input signal into a machine learning model to obtain a first howling point, and obtaining a first gain value according to the first howling point, the first howling point indicating a howling point of a frequency band corresponding to an effective audio signal in the first audio input signal, and the first gain value indicating a suppression parameter of the first howling point;
   processing the first audio input signal according to the first gain value to obtain a second audio input signal;
   detecting the second audio input signal to obtain a second howling point, and obtaining a second gain value according to the second howling point, the second howling point indicating a howling point of a frequency band corresponding to an ineffective audio signal in the second audio input signal; and
   processing the second audio input signal according to the second gain value to obtain an audio output signal.

2. The method according to claim 1, the inputting the first audio input signal into a machine learning model to obtain a first howling point, and obtaining a first gain value according to the first howling point comprising:
   transforming the first audio input signal into a frequency domain to extract a plurality of audio features, the audio features being determined based on features of the effective audio signal;
   inputting a first audio feature into the machine learning model to determine the first howling point; and
   obtaining the corresponding first gain value according to the first howling point.

3. The method according to claim 2, the transforming the first audio input signal into a frequency domain to extract a plurality of audio features comprising:
   adjusting the first audio input signal to a target frequency for transformation into the frequency domain;
   determining a plurality of sampling points in the first audio input signal transformed into the frequency domain; and
   extracting the plurality of audio features based on the sampling points.

4. The method according to claim 3, the determining a plurality of sampling points in the first audio input signal transformed into the frequency domain comprising:
   dividing the first audio input signal transformed into the frequency domain based on a window function to obtain a plurality of subbands; and
   determining the plurality of sampling points in the subbands.

5. The method according to claim 1, the processing the second audio input signal according to the second gain value to obtain an audio output signal comprising:
   obtaining a power spectrum corresponding to the second audio input signal;
   detecting an extreme value in the power spectrum, and determining a corresponding candidate frequency point;
   determining the second howling point according to the candidate frequency point; and
   processing the second howling point according to the second gain value to obtain the audio output signal.

6. The method according to claim 5, the determining the second howling point according to the candidate frequency point comprising:
   obtaining a plurality of frequency points adjacent to the candidate frequency point to determine a candidate range;
   determining an average frequency value of the frequency points in the candidate range to obtain a peak-to-average ratio; and
   determining the candidate frequency point as the second howling point when the peak-to-average ratio is greater than a howling threshold.

7. The method according to claim 5, after the determining the second howling point according to the candidate frequency point, further comprising:
   obtaining feature information in the effective audio signal, the feature information being determined based on a waveform feature indicated by the effective audio signal;
   detecting the corresponding effective audio signal in the second audio input signal according to the feature information; and
   performing a lock operation on the effective audio signal, the lock operation indicating an object on which the second gain value does not apply.

8. The method according to claim 5, further comprising:
   determining a plurality of gain frames corresponding to the second howling point; and processing the gain frames according to a smoothing formula to update the audio output signal.

9. The method according to claim 1, the audio signal processing method being applied to a voice call process of a game, and the obtaining a first audio input signal comprising:
   detecting triggering of a feature element, the feature element being an element in a game interface; and
   obtaining the first audio input signal when the feature element is triggered.

10. The method according to claim 1, the machine learning model being a recurrent neural network (RNN) model, and the first audio input signal and the audio output signal being applied to a voice call process of the terminal device.

11. The method according to claim 1, wherein the machine learning model is trained by:
   acquiring a reference signal and a voice sample signal, the reference signal being a howling signal determined based on at least two variable elements, the variable elements comprising a program category, a program running period, or a program running location, and the acquired signal indicating an effective voice in a call progress;
   generating a feature training set according to the reference signal and the acquired signal; and
   inputting the feature training set into a machine learning model for at least one cycle of training to obtain the trained machine learning model, the trained machine learning model determining a corresponding howling point and gain value according to an audio input signal.

12. A computer device, comprising a processor and a memory,
   the memory being configured to store program code; and
   the processor being configured to, according to instructions in the program code, perform:
   obtaining a first audio input signal;
   inputting the first audio input signal into a machine learning model to obtain a first howling point, and obtaining a first gain value according to the first howling point, the first howling point indicating a howling point of a frequency band corresponding to an effective audio signal in the first audio input signal, and the first gain value indicating a suppression parameter of the first howling point;
   processing the first audio input signal according to the first gain value to obtain a second audio input signal;
   detecting the second audio input signal to obtain a second howling point, and obtaining a second gain value according to the second howling point, the second howling point indicating a howling point of a frequency band corresponding to an ineffective audio signal in the second audio input signal; and
   processing the second audio input signal according to the second gain value to obtain an audio output signal.

13. A non-transitory computer-readable storage medium, storing a computer program, the computer program being configured to perform:
   obtaining a first audio input signal;
   inputting the first audio input signal into a machine learning model to obtain a first howling point, and obtaining a first gain value according to the first howling point, the first howling point indicating a howling point of a frequency band corresponding to an effective audio signal in the first audio input signal, and the first gain value indicating a suppression parameter of the first howling point;
   processing the first audio input signal according to the first gain value to obtain a second audio input signal;
   detecting the second audio input signal to obtain a second howling point, and obtaining a second gain value according to the second howling point, the second howling point indicating a howling point of a frequency band corresponding to an ineffective audio signal in the second audio input signal; and
   processing the second audio input signal according to the second gain value to obtain an audio output signal.

14. The computer-readable storage medium according to claim 13, the inputting the first audio input signal into a machine learning model to obtain a first howling point, and obtaining a first gain value according to the first howling point comprising:
   transforming the first audio input signal into a frequency domain to extract a plurality of audio features, the audio features being determined based on features of the effective audio signal;
   inputting a first audio feature into the machine learning model to determine the first howling point; and
   obtaining the corresponding first gain value according to the first howling point.

15. The computer-readable storage medium according to claim 14, the transforming the first audio input signal into a frequency domain to extract a plurality of audio features comprising:
   adjusting the first audio input signal to a target frequency for transforming into the frequency domain;
   determining a plurality of sampling points in the first audio input signal transformed into the frequency domain; and
   extracting the plurality of audio features based on the sampling points.

16. The computer-readable storage medium according to claim 15, the determining a plurality of sampling points in the first audio input signal transformed into the frequency domain comprising:
   dividing the first audio input signal transformed into the frequency domain based on a window function to obtain a plurality of subbands; and
   determining the plurality of sampling points in the subbands.

17. The computer-readable storage medium according to claim 13, the processing the second audio input signal according to the second gain value to obtain an audio output signal comprising:
   obtaining a power spectrum corresponding to the second audio input signal;
   identifying an extreme value in the power spectrum, and determining a corresponding candidate frequency point;
   determining the second howling point according to the candidate frequency point; and
   processing the second howling point according to the second gain value to obtain the audio output signal.

18. The computer-readable storage medium according to claim 17, the determining the second howling point according to the candidate frequency point comprising:
   obtaining a plurality of frequency points adjacent to the candidate frequency point to determine a candidate range;
   determining an average frequency value of the frequency points in the candidate range to obtain a peak-to-average ratio; and determining the candidate frequency point as the second howling point when the peak-to-average ratio is greater than a howling threshold.

19. The computer-readable storage medium according to claim 17, after the determining the second howling point according to the candidate frequency point, further comprising:

obtaining feature information in the effective audio signal, the feature information being determined based on a waveform feature indicated by the effective audio signal;

detecting the corresponding effective audio signal in the second audio input signal according to the feature information; and performing a lock operation on the effective audio signal, the lock operation indicating an object on which the second gain value does not apply.

20. The computer-readable storage medium according to claim 17, further comprising:

determining a plurality of gain frames corresponding to the second howling point; and processing the gain frames according to a smoothing formula to update the audio output signal.

* * * * *